United States Patent
Rowe et al.

(10) Patent No.: US 7,270,346 B2
(45) Date of Patent: Sep. 18, 2007

(54) VEHICLE FRAME

(75) Inventors: Ryan F. Rowe, Oshkosh, WI (US); Gary Schmiedel, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 69 days.

(21) Appl. No.: 10/950,964

(22) Filed: Sep. 27, 2004

(65) Prior Publication Data

US 2006/0071466 A1    Apr. 6, 2006

(51) Int. Cl.
    *B62D 21/00* (2006.01)
(52) U.S. Cl. .................. 280/781; 280/782; 280/800
(58) Field of Classification Search ........... 280/781, 280/782, 798, 788, 797, 800; 296/184.1, 296/208
    See application file for complete search history.

(56) References Cited

U.S. PATENT DOCUMENTS

| | | | | |
|---|---|---|---|---|
| 1,438,484 A | * | 12/1922 | Garson | ............ 280/788 |
| 1,913,524 A | | 6/1933 | Ulrich | |
| 2,041,936 A | * | 5/1936 | Kliewer | ............ 280/788 |
| 2,875,841 A | * | 3/1959 | Henderson | ............ 280/782 |
| 2,918,982 A | * | 12/1959 | Vlachos | ............ 280/782 |
| 3,084,971 A | * | 4/1963 | Schilberg | ............ 280/782 |
| 3,116,803 A | * | 1/1964 | Buchwald | ............ 280/782 |
| 3,243,201 A | | 3/1966 | Bock | |
| 3,572,517 A | * | 3/1971 | Liebherr et al. | ............ 212/300 |
| 3,763,950 A | | 10/1973 | Rockwell | |
| 4,518,196 A | | 5/1985 | Förster et al. | |
| 4,522,114 A | | 6/1985 | Matsuno | |
| 4,703,948 A | * | 11/1987 | Ehrlich | ............ 280/782 |
| 5,392,873 A | * | 2/1995 | Masuyama et al. | ........ 180/68.5 |
| 5,431,247 A | * | 7/1995 | Kishi | ............ 182/69.4 |
| 5,442,518 A | | 8/1995 | Beam | |
| 5,467,827 A | | 11/1995 | McLoughlin | |
| 5,501,289 A | | 3/1996 | Nishikawa et al. | |
| 5,577,618 A | * | 11/1996 | Rafferty | ............ 209/421 |
| 5,585,204 A | * | 12/1996 | Oshida et al. | ............ 429/62 |
| 5,658,120 A | * | 8/1997 | Watanabe | ............ 280/781 |
| 5,773,768 A | * | 6/1998 | Nuyts | ............ 177/136 |
| 5,984,356 A | * | 11/1999 | Uphaus | ............ 280/781 |
| 6,227,322 B1 | * | 5/2001 | Nishikawa | ............ 180/68.5 |
| 6,270,150 B1 | * | 8/2001 | Miller et al. | ............ 296/184.1 |
| 6,652,021 B1 | | 11/2003 | Dykman et al. | |
| 6,676,159 B1 | * | 1/2004 | Sellergren | ............ 280/783 |
| 6,854,755 B2 | * | 2/2005 | MacKarvich | ............ 280/782 |
| 2005/0161267 A1 | * | 7/2005 | Elson et al. | ............ 280/782 |

* cited by examiner

*Primary Examiner*—Hau Phan
(74) *Attorney, Agent, or Firm*—Foley & Lardner LLP

(57) ABSTRACT

A vehicle frame assembly includes first and second generally parallel chassis rails. At least one of the first and second chassis rails has a first portion defining an internal cavity and at least a second portion defining an enclosed passageway extending along the first portion and within the internal cavity. The at least one of the first and second chassis rails is configured to be coupled to a first component and to provide a routing within the passageway between the first component and a second component.

30 Claims, 3 Drawing Sheets

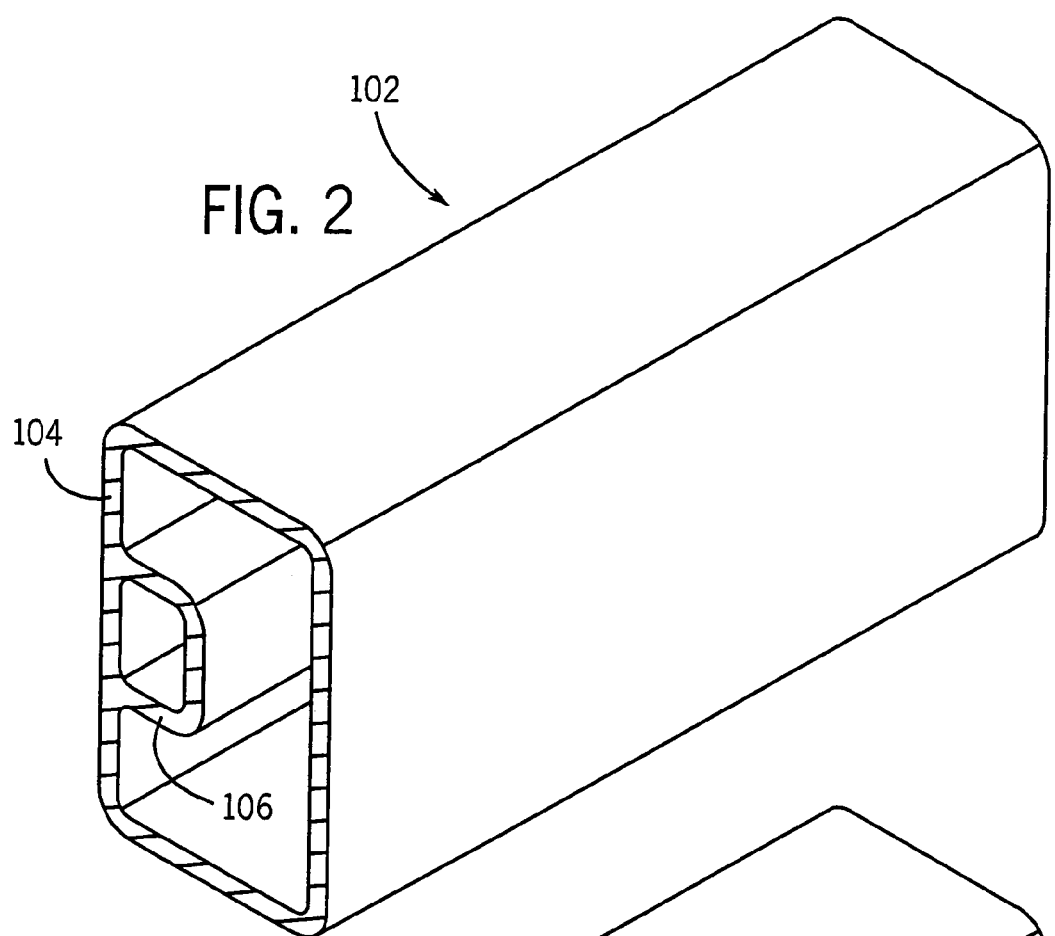
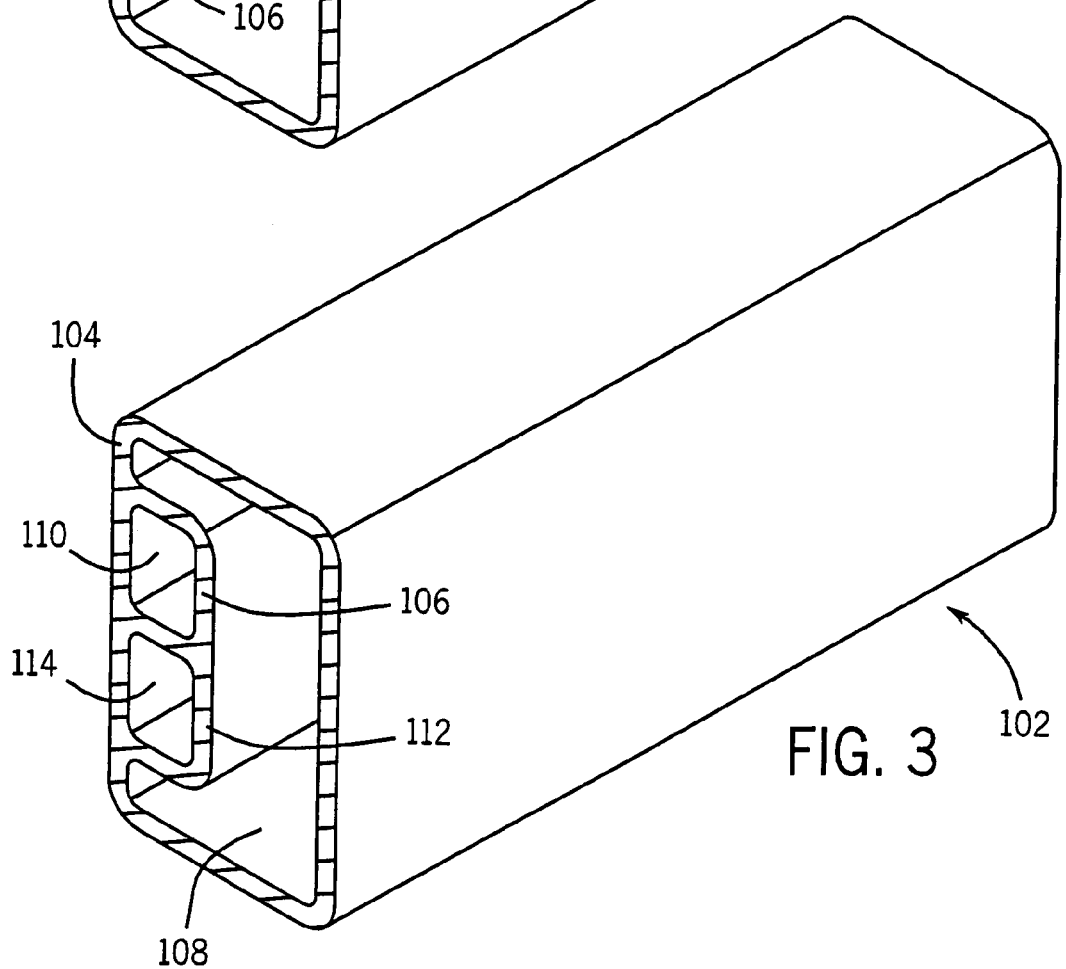

VEHICLE FRAME

FIELD

The present invention relates generally to vehicle frames and particularly to vehicle frames configured to provide a routing between components used in conjunction with various vehicle systems.

BACKGROUND

Vehicle frames typically have one or more parallel chassis rails or other frame members which provide structural support for the vehicle, and a "C-channel" or other hollow extrusion may typically be used to form each chassis rail or other frame member. The components of various vehicle systems are mounted to the vehicle frame. For example, in a typical electric traction vehicle, system components such as an engine, generator, mechanical system components, electrical traction motors and other electrical system components, fuel tank, coolant tanks, hydraulic system components, etc. need to be mounted to the vehicle frame The limited space between the chassis rails and other vehicle frame members is often used for routing the many required interconnections between components, such as electrical wiring, mechanical linkages, exhaust piping, piping or hoses for fluids such as hydraulic oils or coolants, etc. Depending upon the number of system components and the required interconnections between these components, the usable space between the chassis rails and other vehicle frame members may quickly become overcrowded, making assembly of and access to the various components and interconnections increasingly difficult. Routing the interconnections between the chassis rails or other vehicle frame members may also leave the interconnections exposed to damage or excessive wear that can decrease system reliability. Further, exposed routings of high voltage electrical connections, such as a 480 Volt connection between a generator and a traction motor on an electric traction vehicle may create electrical safety hazards. Thus, it would be beneficial to provide a vehicle frame that is configured to facilitate the routing of interconnections between vehicle system components in the usable space within each frame member in order to conserve space and provide a protected routing path for the various system interconnections.

In addition, many vehicle system components generate large amounts of heat that must be dissipated during operation. For example, on a typical electric traction vehicle, a diesel engine, electrical traction motors, axle assemblies, and electronic motor controllers may all be interconnected to a cooling system that circulates a coolant fluid during operation of the vehicle to dissipate the heat generated by these components. Other vehicles may include hydraulic systems that require cooling of a hydraulic fluid during operation. The size and cost of these cooling systems increases with the amount of heat generated by these components. Thus there is further need for a vehicle frame that is configured to facilitate the transfer and cooling of a fluid between a fluid source and various heat-generating vehicle system components in order to reduce the required size and cost of the cooling system.

SUMMARY

According to an exemplary embodiment, a vehicle frame assembly includes first and second generally parallel chassis rails. At least one of the first and second chassis rails has a first portion defining an internal cavity and at least a second portion defining an enclosed passageway extending along the first portion and within the internal cavity. The at least one of the first and second chassis rails is configured to be coupled to a first component and to provide a routing within the passageway between the first component and a second component.

According to another exemplary embodiment, a vehicle includes at least one driven axle assembly, a motor coupled to the axle for driving the axle and at least one frame member supported relative to the axle. The frame member has an enclosed internal passageway extending along the frame member. The frame member is in fluid communication with a vehicle component and with a fluid source supported relative to the frame member in order to facilitate the transfer and cooling of a fluid within the passageway between the fluid source and the vehicle component.

According to another exemplary embodiment, a method of producing a vehicle frame includes providing first and second generally parallel chassis rails. Providing each of the first and second chassis rails includes providing a first portion defining an internal cavity, and providing at least a second portion defining an enclosed passageway extending along the first portion and within the internal cavity. The method also includes configuring at least one of the first and second chassis rails to be coupled to at least a first component and a second component, and configuring the first and second chassis rails to provide a routing within the passageway between the first component and the second component.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 2 is a sectional view of a vehicle frame member according to an exemplary embodiment;

FIG. 3 is a sectional view of a vehicle frame member according to another exemplary embodiment.

DETAILED DESCRIPTION

Before turning to the FIGURES which illustrate the exemplary embodiments in detail, it should be understood that the invention is not limited to the details or methodology set forth in the following description or illustrated in the FIGURES. The invention is capable of other embodiments or being practiced or carried out in various ways. It should also be understood that the phraseology and terminology employed herein is for the purpose of description only and should not be regarded as limiting. Further, while the various exemplary embodiments are primarily described in the context of electric traction vehicles and cooling systems, it is to be understood that other types of vehicles and vehicle systems are contemplated as well. The term "electric traction vehicle" as used herein generally refers to a vehicle that uses electricity in some form or another to provide all or part of the propulsion power of the vehicle.

In general, the vehicle frame described herein comprises an enclosed passageway within an internal cavity of one or more frame members such that it is configured to provide a routing between components used in conjunction with various vehicle systems. According to various embodiments, the vehicle frame is intended to be used with any suitable vehicle having any of a number of suitable vehicle systems. For example, the vehicle frame may be used with electric traction vehicles designed for heavy-duty applications, such as military vehicles, waste management trucks (e.g., garbage trucks) etc., having various vehicle systems such as electrical systems, cooling systems, hydraulic systems, etc. that require routing of electrical wires or fluids between various system components. Routing electrical wires and fluids through a passageway within the vehicle frame provides for additional space for other vehicle systems and components between the frame members, provides additional protection from damage, and further provides a safe routing for electrical wiring.

According to various other embodiments, the vehicle frame is further configured to facilitate transfer and cooling of a fluid within the passageway between various vehicle components. For example, the vehicle frame may be used to facilitate the transfer and cooling of coolant fluids (e.g., ethylene glycol, water etc.) hydraulic fluids, air, etc. between various heat-generating vehicle system components, such as motors, axles, or motor controllers used in the traction system of an electric traction vehicle. Configuring the vehicle frame to facilitate transfer and cooling of fluids may lead to a reduction in the size and cost of components required to provide cooling for heat-generating vehicle components.

Figure 1:
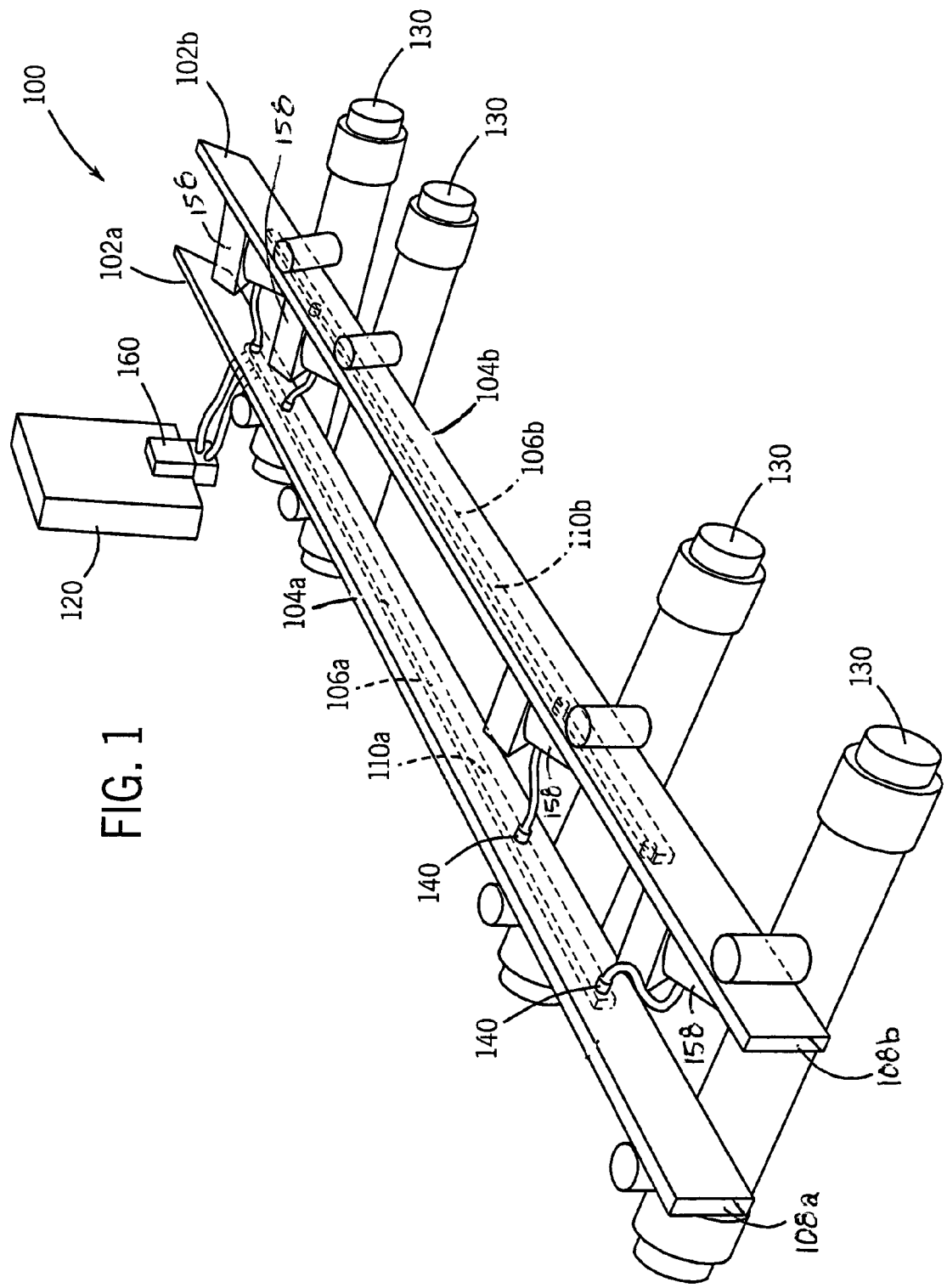
FIG. 1 is a perspective view of a vehicle frame according to an exemplary embodiment.

FIG. 1 illustrates a vehicle frame assembly 100 according to an exemplary embodiment. Vehicle frame assembly 100 includes one or more frame members 102. For example, in the illustrated embodiment, vehicle frame assembly 100 includes frame members 102a and 102b, which are arranged as two generally parallel chassis rails. According to various other embodiments, vehicle frame assembly 100 includes at least one frame member 102 in addition to frame members having configurations other than frame member 102 as may be required by the vehicle in which vehicle frame assembly 100 is used. Vehicle frame assembly 100 is generally configured to provide a support structure for a vehicle as well as a routing between components used in conjunction with various vehicle systems. According to various other embodiments, vehicle frame assembly 100 is further configured to facilitate transfer and cooling of a fluid between various vehicle components.

Frame member 102 includes a portion 104 and a portion 106. Portion 104 is generally configured as an elongated structural or supportive member (e.g., a beam, channel, tubing, extrusion, etc.) which generally defines a supportive or structural exterior of frame member 102 as well as an internal cavity 108. For example, in the illustrated embodiment, portions 104a and 104b are elongated "C-channel" members which define internal cavities 108a and 108b of frame members 102a and 102b respectively. Portion 104 is constructed from materials that provide strength, durability and corrosion resistance, as well as heat absorption, such as steel, aluminum, or other metals, alloys or composites.

Portion 106 is generally configured to define an enclosed passageway 110 extending along portion 104 and within internal cavity 108. For example, in the illustrated embodiment, portions 106a and 106b define enclosed passageways 110a and 110b extending along portions 104a and 104b of frame members 102a and 102b respectively. Portion 106 generally defines enclosed passageway 110 such that vehicle frame assembly 110 is configured to provide an enclosed routing through the passageway between components used in conjunction with various vehicle systems, such as a routing for electrical wiring, cooling fluids, hydraulic fluids, air, etc. For example, in the illustrated embodiment, portions 106a and 106b are elongated hollow tubular extrusions (e.g., pipes, conduits, circular or square tubing etc.) configured to allow the passage of electrical wires or fluids therein.

Portion 106 is constructed from materials that provide strength, durability and corrosion resistance, as well as heat absorption, such as steel, aluminum, or other metals, alloys or composites. Portion 106 may be accordingly sized to accommodate the required electrical wiring, to accommodate flow rates and pressure requirements for the fluid to be routed through passageway 110, or to provide a desired amount of heat dissipation. Preferably, portion 106 is positioned within cavity 108 in a location where drilling, welding, or mounting of other components will not occur.

Portions 104 and 106 may comprise separate pieces or may be integrally formed as a single unitary body. For example, in the illustrated embodiment, portions 106a and 106b are pieces separate from portions 104a and 104b. In embodiments wherein portions 104 and 106 comprise separate pieces, portions 104 and 106 are assembled to form frame member 102 by mounted to or fixed relative to portions 104a 104b using studs, fittings, or brackets which may be welded to portions 104a 104b or attached to portions 104a 104b using fasteners (e.g., bolts, screws, etc.).

FIG. 2 illustrates an exemplary embodiment of frame member 102 wherein portions 104 and 106 are integral as a single unitary body. According to an exemplary embodiment, portions 104 and 106 may be integrally formed from a single piece of material using, for example, suitable bending and welding processes. According to another exemplary embodiment, portions 104 and 106 may be integrally formed using an extrusion process (e.g., an aluminum extrusion, etc.).

FIG. 3 illustrates an exemplary embodiment of frame member 102 wherein multiple passageways are defined within cavity 108. In this embodiment, frame member includes portions 104 and 106, as well as a portion 112 defining a passageway 114 in addition to passageway 110. As shown in FIG. 3, portion 114 may be integrally formed as a single unitary body with portions 104 and 106 (e.g., as an aluminum extrusion, etc.). According to another exemplary embodiment, portion 112 may comprise a separate piece in addition to portions 104 and 106, and may be mounted or fixed relative to portions 104 and 106 as described above. According to various other embodiments, any desired number of passageways may be provided in addition to passageway 110.

Referring again to FIG. 1, frame member 102 is configured to be coupled to one or more components used in conjunction with various vehicle systems and to provide a routing within the passageway between the components. For example, in the illustrated embodiment, a fluid source 120 (shown as a radiator in FIG. 1) and a plurality of axle assemblies 130 are shown coupled to each of frame members 102a and 102b such that passageways 110a and 110b provide a routing between these components for a fluid (e.g., a coolant fluid, a lubricant, etc.). For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In the illustrated embodiment, frame members 102a and 102b each include a plurality of access ports 140 configured to provide access to passageway 110 such that one or more components may be coupled to them. According to various embodiments, each access port 140 may comprise an appropriate fitting (e.g., a fluid, electrical, or air fitting) fitted into (e.g., threaded, welded, etc,) an aperture in frame member 102 extending through to passageway 110.

Figure 4:
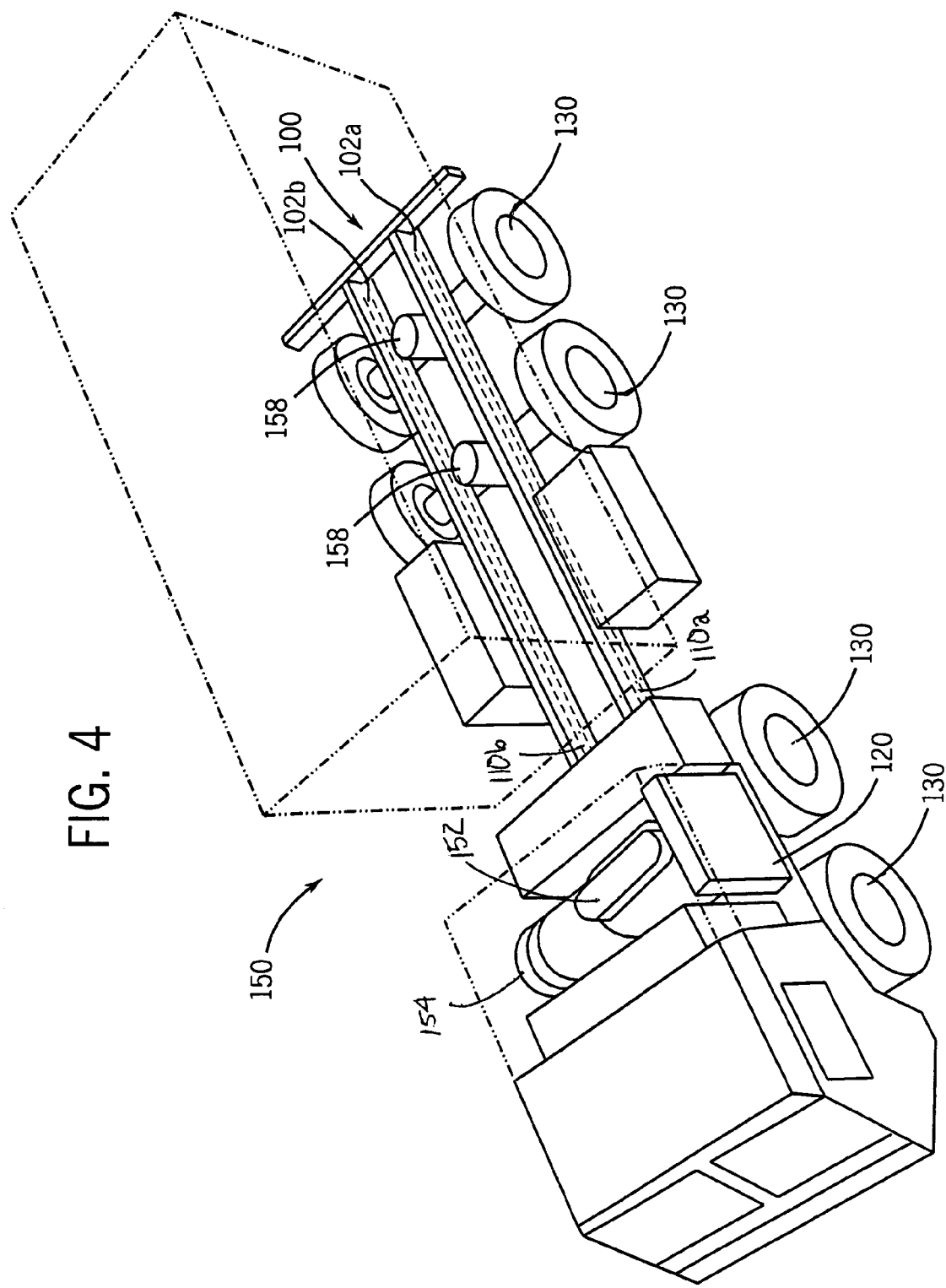
FIG. 4 is a perspective view of a vehicle including the vehicle frame of FIG. 1 according to an exemplary embodiment.

FIG. 4 illustrates a vehicle 150 including vehicle frame assembly 100 according to an exemplary embodiment. In the illustrated embodiment, vehicle 150 is an electric traction vehicle. An electric traction vehicle is a vehicle that uses electricity in some form or another to provide all or part of the propulsion power of the vehicle. A hybrid electric vehicle is an electric traction vehicle that uses more than one source of energy, such as energy storage device 100 another source, such as an internal combustion engine. Vehicle 150 may be used to implement electric vehicles in general and/or hybrid electric vehicles in particular. Vehicle 150 can implement a number of different vehicle types, such as a fire fighting vehicle, military vehicle, snow blower vehicle, refuse-handling vehicle, concrete mixing vehicle, etc. According to various alternative embodiments, vehicle 150 may include other types of vehicles, such as two-wheel or four wheel drive vehicles having internal combustion engines coupled to conventional mechanical drive trains (e.g, passenger vehicles, trucks, tractors, heavy-duty off-road vehicles, etc.).

In the illustrated embodiment, vehicle 150 includes vehicle frame 100, fluid source 120 (shown as a radiator in FIGS. 1 and 4), and one or more driven axle assemblies 130. Vehicle 150 also includes a prime mover 152, a generator or alternator 154, and one or more motors 158. Vehicle 150 is generally configured to utilize vehicle frame 100 in order to facilitate the transfer and cooling of a fluid between fluid source 120 and a vehicle component, such as axle assembly 130, motor 158, or an electronic controller coupled to the motor.

In the illustrated embodiment, frame members 102a and 102b of vehicle frame assembly 100 in vehicle 150 are arranged as two generally parallel chassis rails supported relative to axle assemblies 130 such that vehicle frame assembly 100 provides support for the various components of vehicle 150. Frame members 102a and 102b include enclosed internal passageways 110a and 110b, as defined by portions 104a and 104b, and portions 106a and 106b. Frame members 102a and 102b are coupled to fluid source 120 and axle assemblies 130 such that vehicle frame 100 facilitates the transfer and cooling of a fluid within passageways 110a and 110b between fluid source 120 and axle assemblies 130. According to various other embodiments, frame members 102a and 102b are alternatively or additionally coupled to each motor 158 and/or to one or more controllers coupled to each motor 158.

Prime mover 152 is mounted relative to vehicle frame assembly 100 and coupled to generator or alternator 154 in order provide rotational energy to drive generator or alternator 154. Prime mover 152 may be a gas turbine, an internal combustion engine, such as a diesel or gasoline engine, or the like. Preferably, prime mover 152 is a diesel engine optimized for operation at a constant speed (revolutions per minute). Operating the diesel engine at a constant, optimal speed eliminates inefficiencies associated with changing RPM levels during acceleration and deceleration, improves overall efficiency, and reduces emissions.

Generator or alternator 154 is preferably a device such as a synchronous generator that supplies electric 460 to 480 volts, three-phase A/C 60 Hz power to each motor 158. According to various other embodiments, different sized generators or alternators 154 may be coupled to the prime mover for purposes of generating either higher or lower amounts of electrical power. In yet other embodiments, a single phase system may be utilized, or a system that operates at a frequency other than 60 Hz, which is typical in European countries.

Each motor 158 is an appropriately sized electric motor, such as a 480 volt three-phase induction motor. In the illustrated embodiment, each motor 158 is coupled to a respective axle assembly 130 to serve as a traction motor for driving each axle assembly 130. Preferably, motor 158 has a simple cast rotor, machine mount stator, and sealed ball bearings, and has no brushes, internal switches, or sliding contact devices so that the rotor is the only moving part of motor 158. Each motor 158 may operate to produce electric torque to each respective axle assembly 130 or may operate in a regenerative braking mode to provide power to an energy storage device, as determined by inputs received from an operator of vehicle 150. Each motor 158 may also be coupled to a heat exchanger or other cooling device which may be coupled to vehicle frame assembly 100 such that vehicle frame 100 facilitates the transfer and cooling of a fluid within passageways 110a and 110b between fluid source 120 and the heat exchanger. Vehicle 150 may also include one or more electronic controllers coupled to the various traction motors in order to control the operation of each motor 158, such as adjusting the torque output of the motor based on rotational speed and power requirements.

According to another exemplary embodiment, vehicle 150 may be a hybrid vehicle. By having more than one source of energy some optimizations in the design can allow for more efficient power production, such that power from the different sources can be used in a more efficient system for traction. In this embodiment, vehicle 150 may include an energy storage device, such as electric capacitors, storage batteries, a flywheel, or hydraulic accumulators, to store and provide electric power above and beyond the power provided by prime mover 152 and generator or alternator 154. According to an exemplary embodiment, the energy storage device is formed of a bank of ultracapacitors, such as the PC 2500 ultracapacitor available from Maxwell Technologies, 9244 Balboa Avenue San Diego, Calif. 92123. These devices provide a high electrical energy storage and power capacity and have the ability to deliver bursts of high power and recharge rapidly from an electrical energy source/sink over hundreds of thousands of cycles.

Referring to FIGS. 1 and 4, use of vehicle frame 100 as a cooling circuit to facilitate the transfer and cooling of a coolant fluid (e.g., water, ethylene glycol, etc.) between fluid source 120 and axle assemblies 130 is shown. Frame member 102a is coupled to and in fluid communication with a fluid source 120 through a pump 160, and is coupled to and in fluid communication with each of axle assemblies 130 via access ports 140, which provide an outlet from passageway 110a in frame member 102a to each axle assembly 130 for coolant fluid from fluid source 120. Frame member 102b is also coupled to and in fluid communication with fluid source 120, and is coupled to and in fluid communication with each axle assembly 130 via access ports 140, which provide an inlet to passageway 110*b* of frame member 102*b* for coolant fluid from each axle assembly 130.

During operation of the cooling circuit, pump 160 generates a flow of coolant fluid from fluid source 120 such that coolant fluid that has been cooled by fluid source 120 is provided to passageway 110*a* of frame member 102*a* and to each of axle assemblies 130 in the direction shown in FIG. 1. During operation of vehicle 150, the coolant fluid cooled by fluid source 120 is typically at a higher temperature than the ambient temperature of frame member 102*a*. As the coolant fluid passes through passageway 110*a* of frame member 102*a*, some of the heat in the coolant fluid is absorbed by conduction and dissipated by frame member 102*a*, which is at an ambient temperature that is lower than the coolant fluid. The conduction of heat from the coolant fluid to frame member 102*a* lowers the temperature of the coolant fluid provided by the fluid source to each axle assembly 130.

As the coolant fluid passes through each axle assembly 130, it absorbs heat generated by each axle assembly, which raises the temperature of the coolant fluid. According to an exemplary embodiment, the temperature of the coolant fluid reaches approximately 200 degrees Fahrenheit after passing through each axle assembly 130. Coolant fluid from each axle assembly then passes from each axle assembly to passageway 110*b* of frame member 102*b*.

The coolant fluid passes through passageway 110*b* of frame member 102*b* and returns to fluid source 120 in the direction show in FIG. 1. As the coolant fluid passes through passageway 110*b* of frame member 102*b*, some of the heat absorbed by the coolant fluid from axle assemblies 130 is absorbed by conduction and dissipated by frame member 102*b*, which is at an ambient temperature that is lower than the heated coolant fluid. The conduction of heat from the coolant fluid to frame member 102*b* lowers the temperature of the coolant fluid from each axle assembly 130 before it returns to fluid source 120. The amount of heat dissipated through frame members 102*a* and 102*b* will depend on such factors as the type and amount of material used to form frame member 102*a* and 102*b*, the length of passageways 110*a* and 110*b* and the effective surface area of the coolant exposed to portions 104*a*, 104*b* 106*a*, and 106*b*, the rate of flow of the coolant through passageways 110*a* and 110*b*, the difference in temperature between the heated coolant fluid and frame members 102*a* and 102*b*, the rate of airflow around frame members 102*a* and 102*b* and through cavities 108*a* and 108*b*, etc.

The vehicle frame as described herein may be used in a variety of other vehicle system applications. For example, according to an exemplary embodiment, the vehicle frame may be used to provide transfer and cooling of hydraulic fluid in vehicles having one or more associated hydraulic systems, such as a hydraulic lift. According to another exemplary embodiment, the vehicle frame may be used with a fire truck or airport rescue vehicle to distribute a flame retardant material (e.g., water) from a reservoir internal or external to the vehicle to one or more dispenser nozzles, such as a dispenser nozzle for an elevated waterway or a plurality of dispenser nozzles underneath the vehicle configured to cool the tires of the vehicle.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A vehicle frame assembly comprising:
   first and second generally parallel chassis rails formed from a heat-conductive material, at least one of the first and second chassis rails having a first portion defining an internal cavity and at least a second portion defining an enclosed fluid cooling passageway extending along the first portion and within the internal cavity;
   a first component coupled to the vehicle frame and a second component coupled to the vehicle frame;
   wherein the at least one of the first and second chassis rails is configured to be coupled to the first component and to provide a routing for a fluid within the fluid cooling passageway between the first component and the second component, so that the fluid is cooled by contact with the heat conductive material as the fluid flows between the first component and the second component.

2. The vehicle frame assembly of claim 1, wherein the second portion comprises a tubular extrusion mounted to the first portion.

3. The vehicle frame assembly of claim 1, wherein the first and second portions are integral as a single unitary body.

4. The vehicle frame assembly of claim 3, wherein the first and second portions are an extrusion.

5. The vehicle frame assembly of claim 1, wherein the at least one of the first and second chassis rails further comprises a plurality of access ports configured to provide access to the fluid cooling passageway.

6. The vehicle frame assembly of claim 1, wherein the second portion defines a first enclosed fluid cooling passageway extending along the first portion and within the internal cavity, and further comprising a third portion defining a second enclosed fluid cooling passageway extending along the first portion and within the internal cavity.

7. The vehicle frame assembly of claim 1, wherein each of the first and second chassis rails has a first portion defining an internal cavity and at least a second portion defining an enclosed fluid cooling passageway extending along the first portion and within the internal cavity.

8. The vehicle frame assembly of claim 7, wherein the first chassis rail is configured to facilitate transfer and cooling of a fluid from the second component through the fluid cooling passageway to the first component and the second chassis rail is configured to facilitate transfer and cooling of the fluid from the first component through the fluid cooling passageway to the second component.

9. The vehicle frame assembly of claim 8, wherein the first device component is a radiator, and the fluid is a coolant.

10. The vehicle frame assembly of claim 8, wherein the second component is one of an axle, a motor, and a motor controller.

11. A vehicle comprising:
    at least one driven axle assembly;
    a motor coupled to the axle for driving the axle; and at least one frame member formed from a heat-conductive material and supported relative to the axle, the frame member having an enclosed internal fluid cooling passageway extending along the frame member;

wherein the frame member is in fluid communication with a vehicle component and with a fluid source supported relative to the frame member in order to facilitate the transfer of a fluid within the fluid cooling passageway between the fluid source and the vehicle component and cooling of the fluid by contact with the heat-conductive material of the at least one frame member.

12. The vehicle of claim 11, wherein the frame member is a first chassis rail, and further comprising a second chassis rail supported relative to the axle and generally parallel with the first chassis rail, the second chassis rail having an enclosed internal fluid cooling passageway extending along the second chassis rail.

13. The vehicle of claim 12, wherein the first chassis rail is configured to facilitate transfer and cooling of the fluid from the vehicle component to the fluid source and the second chassis rail is configured to facilitate transfer and cooling of the fluid from the fluid source to the vehicle component.

14. The vehicle of claim 11, wherein the fluid source is a radiator and the fluid is a coolant.

15. The vehicle of claim 11, wherein the at least one frame member comprises at least a first portion defining an internal cavity and a second portion defining the enclosed fluid cooling passageway, and wherein the second portion extends along the frame member and within the internal cavity.

16. The vehicle of claim 15, wherein the second portion comprises a tubular extrusion mounted to the first portion.

17. The vehicle of claim 15, wherein the first and second portions are integral as a single unitary body.

18. The vehicle of claim 17, wherein the first and second portions are extruded.

19. The vehicle of claim 11, wherein the at least one frame member further comprises a plurality of access ports configured to provide access to the fluid cooling passageway.

20. The vehicle of claim 11, wherein the vehicle is an electric traction vehicle and the motor is an electric motor.

21. The vehicle of claim 11, wherein the vehicle component is at least one of the driven axle assembly, the motor, and a controller coupled to the motor.

22. A method of producing a vehicle frame for cooling a fluid, comprising:

providing first and second generally parallel chassis rails formed from a heat conductive material, wherein providing each of the first and second chassis rails includes:

providing a first portion defining an internal cavity; and providing at least a second portion defining an enclosed fluid cooling passageway having a heat transfer surface area extending along the first portion and within the internal cavity;

configuring at least one of the first and second chassis rails to be coupled to at least a first component and a second component; and configuring the first and second chassis rails to provide a routing within the fluid cooling passageway between the first component and the second component, to cool the fluid as it flows between the first component and the second component.

23. The method of claim 22, wherein the providing second portion comprises providing a tubular extrusion mounted to the first portion.

24. The method of claim 22, wherein providing each of the first and second chassis rails further comprises providing the first and second portions such that they are integral as a single unitary body.

25. The method of claim 24, wherein providing the first and second portions such that they are integral as a single unitary body comprises extruding the first and second portions.

26. The method of claim 22, further comprising providing a plurality of access ports to provide access to the fluid cooling passageway.

27. The method of claim 22, wherein the second portion defines a first enclosed fluid cooling passageway extending along the first portion and within the internal cavity, and further comprising providing a third portion defining a second enclosed fluid cooling passageway extending along the first portion and within the internal cavity.

28. The method of claim 22, wherein configuring the first and second chassis rails to provide a routing within the fluid cooling passageway between the first component and the second component comprises configuring the first chassis rail to facilitate transfer and cooling of a fluid from the second component to the first component and configuring the second chassis rail to facilitate transfer and cooling of the fluid from the first component to the second component.

29. The method of claim 22, wherein the first component is a radiator, and the fluid is a coolant.

30. The method of claim 22, wherein the second component is at least one of an axle, a motor, and a motor controller.

* * * * *